(12) United States Patent
Thiel

(10) Patent No.: US 7,648,768 B2
(45) Date of Patent: Jan. 19, 2010

(54) HYBRID COATING STACK

(75) Inventor: James P. Thiel, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 40 days.

(21) Appl. No.: 11/756,664

(22) Filed: Jun. 1, 2007

(65) Prior Publication Data

US 2007/0281184 A1 Dec. 6, 2007

Related U.S. Application Data

(63) Continuation of application No. 10/832,600, filed on Apr. 27, 2004, now abandoned.

(51) Int. Cl.
*B32B 15/04* (2006.01)
(52) U.S. Cl. ............... 428/432; 428/469; 427/419.2
(58) Field of Classification Search ............... 428/432, 428/469, 697, 699, 702; 427/419.2
See application file for complete search history.

(56) References Cited

U.S. PATENT DOCUMENTS

| | | | |
|---|---|---|---|
| 3,762,988 A | 10/1973 | Clock et al. | 161/183 |
| 4,189,205 A | 2/1980 | Vandehei | 350/1.7 |
| 4,287,107 A | 9/1981 | Hermann et al. | 260/28.5 |
| 4,379,040 A | 4/1983 | Gillery | 204/192 P |
| 4,504,109 A | 3/1985 | Taga et al. | 350/1.6 |
| 4,610,771 A | 9/1986 | Gillery | 204/192.1 |
| 4,716,086 A | 12/1987 | Gillery et al. | 428/630 |
| 4,746,347 A | 5/1988 | Sensi | 65/94 |
| 4,792,536 A | 12/1988 | Pecoraro et al. | 501/70 |
| 4,806,220 A | 2/1989 | Finley | 204/192.27 |
| 4,834,857 A | 5/1989 | Gillery | 204/192.27 |
| 4,861,669 A | 8/1989 | Gillery | 428/434 |
| 4,898,789 A | 2/1990 | Finley | 428/623 |
| 4,898,790 A | 2/1990 | Finley | 428/623 |
| 4,900,633 A | 2/1990 | Gillery | 428/432 |
| 4,902,580 A | 2/1990 | Gillery | 428/623 |
| 4,920,006 A | 4/1990 | Gillery | 428/432 |
| 4,938,857 A | 7/1990 | Gillery | 204/192.27 |
| 4,948,677 A | 8/1990 | Gillery | 428/623 |

(Continued)

FOREIGN PATENT DOCUMENTS

EP 0 464 789 A1 1/1992

(Continued)

OTHER PUBLICATIONS

U.S. Appl. No. 60/355,912, filed Feb. 11, 2002.

(Continued)

*Primary Examiner*—Timothy M Speer
*Assistant Examiner*—Lauren Robinson
(74) *Attorney, Agent, or Firm*—Andrew C. Simiherio

(57) ABSTRACT

A coating includes a functional coating, such as a solar control coating having at least one metal layer. A topcoat is formed over at least a portion of the functional coating. The topcoat includes a first topcoat layer having a thickness in the range of 0.5 QWOT to 1.5 QWOT with respect to a reference wavelength of 550 nm and a first refractive index, and a second topcoat layer having a thickness in the range of 0.5 QWOT to 1.5 QWOT with respect to a reference wavelength of 550 nm and a second refractive index different from the first refractive index.

11 Claims, 2 Drawing Sheets

U.S. PATENT DOCUMENTS

| | | | |
|---|---|---|---|
| 4,952,423 A | 8/1990 | Hirata et al. | 427/109 |
| 5,028,759 A | 7/1991 | Finley | 219/203 |
| 5,059,295 A | 10/1991 | Finley | 204/192.27 |
| 5,240,886 A | 8/1993 | Gulotta et al. | 501/70 |
| 5,328,768 A | 7/1994 | Goodwin | 428/428 |
| 5,385,872 A | 1/1995 | Gulotta et al. | 501/71 |
| 5,393,593 A | 2/1995 | Gulotta et al. | 428/220 |
| 5,492,750 A | 2/1996 | Shumaker, Jr. et al. | 428/192 |
| 5,653,903 A | 8/1997 | Pinchok, Jr. et al. | 219/203 |
| 5,821,001 A | 10/1998 | Arbab et al. | 428/623 |
| 6,441,964 B1 | 8/2002 | Chu et al. | 359/585 |
| 2001/0031365 A1* | 10/2001 | Anderson et al. | 428/432 |
| 2001/0040733 A1* | 11/2001 | Toyoshima et al. | 359/585 |
| 2002/0136905 A1* | 9/2002 | Medwick et al. | 428/432 |
| 2002/0141064 A1 | 10/2002 | Chu et al. | |
| 2002/0172775 A1* | 11/2002 | Buhay et al. | 427/376.2 |
| 2003/0224181 A1* | 12/2003 | Finley et al. | 428/432 |
| 2005/0243570 A1* | 11/2005 | Chaves et al. | 362/551 |

FOREIGN PATENT DOCUMENTS

| | | |
|---|---|---|
| FR | 2 858 816 | 2/2005 |
| GB | 2302102 | 8/1997 |

OTHER PUBLICATIONS

U.S. Appl. No. 09/058,440, filed Apr. 9, 1998.
International Search Report mailed Oct. 19, 2005.

* cited by examiner

HYBRID COATING STACK

BACKGROUND OF THE INVENTION

1. Field of the Invention

This invention relates generally to coatings and coated articles and, more particularly, to coatings having a solar control coating with a durability-enhancing topcoat and to articles coated therewith.

2. Description of the Currently Available Technology

Solar control coatings are known for controlling the amount of solar radiation passing into buildings, vehicles, and other structures. These solar control coatings can block or reflect selected electromagnetic wavelengths and can help reduce the costs of heating and/or cooling.

Conventional solar control coatings typically include an infrared reflecting metal layer positioned between two dielectric layers. Conventional dielectric layers typically include metal oxides. A thin protective overcoat, such as titania, is deposited over the outermost dielectric layer to help protect the underlying layers from chemical and mechanical damage. Examples of known solar control coatings are disclosed in U.S. Pat. Nos. 4,610,771; 4,716,086; and 4,898,789.

Coated substrates, such as glass substrates coated with solar control coatings, can be utilized in laminated or non-laminated articles. An example of a laminated article is a conventional automotive windshield. An example of a non-laminated article is a conventional architectural window. Known solar control coatings are well suited for their intended purpose of modifying the solar control properties of the coated article.

However, conventional solar control coatings can be susceptible to mechanical or chemical damage during handling even with a conventional protective overcoat. While it would be possible to increase the mechanical and/or chemical durability of a conventional solar control coating stack by increasing the thickness of the outer protective overcoat, such an increase in thickness would also impact other parameters of the coated article, such as the reflectance, transmittance, or emissivity of the article and could significantly change the transmission characteristics, solar performance properties, and aesthetics of the coated article. This would be disadvantageous, particularly for coated glass articles destined for use in the automotive field where solar control properties, such as transmittance and/or reflectance, are controlled to meet government regulations. Additionally, increasing the thickness of the protective overcoat could also adversely impact upon the processing parameters of the coated article, such as adversely impacting the bending, annealing, tempering, or laminating processes.

Coating stacks for non-solar control purposes are known. For example, conventional camera lenses typically include an anti-reflective coating made up of a series of layers of high and low refractive index materials. These layers reduce visible light reflection when taking photographs. While these anti-reflective lens coatings are adequate for their intended purpose of reducing visible light reflection, they do not have infrared reflective metal layers and, thus, provide little or no solar control properties. While one might consider adding a conventional lens coating to a conventional solar control coating stack, such a combination would not be feasible since the resultant coating stack would not meet the optical and/or solar reflecting characteristics typically required for solar control articles, such as automotive transparencies and architectural transparencies.

Therefore, it would be advantageous to provide a coating stack having solar control properties as well as enhanced durability but without adversely impacting upon the solar control and/or aesthetic properties of the coating stack.

SUMMARY OF THE INVENTION

A coating comprises a functional coating, such as a solar control coating comprising at least one metal layer. A topcoat is formed over at least a portion of the functional coating. The topcoat comprises a first topcoat layer having a thickness in the range of 0.5 Quarter Wave Optical Thickness (QWOT) to 1.5 QWOT with respect to a reference wavelength of 550 nm and a first refractive index, and a second topcoat layer having a thickness in the range of 0.5 QWOT to 1.5 QWOT with respect to a reference wavelength of 550 nm and a second refractive index different from the first refractive index. In one non-limiting embodiment, one of the first topcoat layer or the second topcoat layer comprises at least one metal oxide selected from oxides of aluminum, silicon, yttrium, tin, and mixtures thereof, and the other of the first topcoat layer or second topcoat layer comprises at least one metal oxide selected from oxides of titanium, zirconium, niobium, bismuth, tungsten, zinc, tin, and mixtures thereof. The topcoat can further include a third topcoat layer having a thickness in the range of 0.5 QWOT to 1.5 QWOT. In one non-limiting embodiment, the third topcoat layer comprises silica.

Another coating comprises a functional coating, such as a solar control coating comprising at least one infrared reflective metal layer. A topcoat is formed over at least a portion of the functional coating. The topcoat comprises a first topcoat layer deposited over at least a portion of the functional coating and a second topcoat layer deposited over at least a portion of the first topcoat layer. The refractive index of the first topcoat layer can differ from the refractive index of the second topcoat layer by a value in the range of 0.2 to 1.

A coated article comprises a substrate and a coating as defined above deposited over at least a portion of the substrate.

Another coated article comprises a substrate and a coating deposited over at least a portion of the substrate. The coating comprises: (a) a functional coating comprising a first metal oxide layer, a second metal oxide layer, and an infrared reflective metal layer positioned between the first and second metal oxide layers, and (b) a topcoat formed over the functional coating and comprising a first topcoat layer and a second topcoat layer, wherein the first topcoat layer has a thickness in the range of 0.5 QWOT to 1.5 QWOT with respect to a reference wavelength of 550 nm and a first refractive index of either (i) less than or equal to 2 or (ii) greater than 2, and the second topcoat layer has a thickness in the range of 0.5 QWOT to 1.5 QWOT with respect to a wavelength of 550 nm and a second refractive index of (i) greater than 2 when the first refractive index is less than or equal 2 or (ii) less than or equal to 2 when the first refractive index is greater than 2.

DESCRIPTION OF THE PREFERRED EMBODIMENTS

Figure 1:
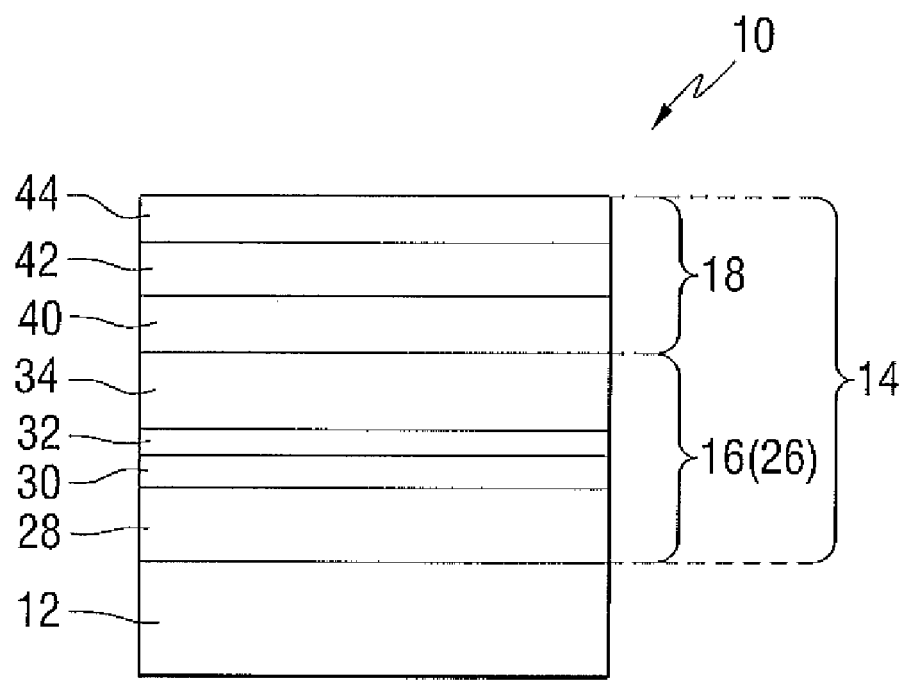
FIG. 1 is a cross-sectional view (not to scale) of a monolithic article having a hybrid coating incorporating features of the invention.

As used herein, spatial or directional terms, such as "inner", "outer", "above", "below", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.7, 5.5 to 10, or 6.5 to 9.5, just to name a few. As used herein, the terms "deposited over", "applied over", or "formed over" mean deposited, applied, or formed on but not necessarily in contact with the surface. For example, a material "deposited over" a substrate does not preclude the presence of one or more other materials of the same or different composition located between the deposited material and the substrate. Additionally, all references referred to herein are to be understood as being incorporated by reference in their entirety. The terms "visible region" or "visible light" refer to electromagnetic radiation having a wavelength in the range of 400 nm to 700 nm. The terms "infrared region" or "infrared radiation" refer to electromagnetic radiation having a wavelength in the range of greater than 700 nm to 100,000 nm. The terms "ultraviolet region" or "ultraviolet radiation" mean electromagnetic energy having a wavelength in the range of 300 nm to less than 400 nm. The term "film" refers to a region of a coating having a desired or selected composition. A "layer" comprises one or more "films". A "coating" or "coating stack" is comprised of one or more "layers". All quarter wave optical thicknesses values herein are defined relative to a reference wavelength of 550 nm.

An exemplary coated article 10 incorporating features of the invention is shown in FIG. 1. The article 10 includes a substrate 12 which can have at least one major surface. A hybrid coating 14 of the invention can be formed over at least a portion of the substrate 12. In the embodiment illustrated in FIG. 1, the hybrid coating 14 comprises at least one functional coating 16 formed over at least a portion of the substrate 12, e.g., over at least a portion of a major surface, and an antireflective topcoat 18 of the invention formed over at least a portion of the functional coating 16. The article 10 can be a monolithic article, as shown in FIG. 1. By "monolithic" is meant having a single structural substrate or primary ply. By "primary ply" is meant a primary support or structural member. Or, as will be described with respect to FIG. 2, the invention can be practiced to form a laminated article.

In the broad practice of the invention, the substrate 12 can be of any desired dimensions, e.g., length, width, shape, or thickness, and can be of any desired material having any desired characteristics, such as opaque, translucent, or transparent to visible light. By "transparent" is meant having a transmittance of visible light through the substrate of greater than 0% up to 100%. By "translucent" is meant allowing electromagnetic energy (e.g., visible light) to pass through the substrate but diffusing this energy such that objects on the side of the substrate opposite to the viewer are not clearly visible. By "opaque" is meant having a visible light transmittance of less than 0.001%. Examples of suitable substrates include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); metal substrates, such as but not limited to galvanized steel, stainless steel, and aluminum; ceramic substrates; tile substrates; glass substrates; fiberglass substrates; or mixtures or combinations of any of the above. For example, the substrate can be conventional untinted soda-lime-silica glass, i.e., "clear glass", or can be tinted or otherwise colored glass, borosilicate glass, leaded glass, tempered, untempered, annealed, or heat-strengthened glass. The glass can be of any type, such as conventional float glass or flat glass, and can be of any composition having any optical properties, e.g., any value of visible radiation transmission, ultraviolet radiation transmission, infrared radiation transmission, and/or total solar energy transmission. Typical automotive-type glasses can have such colors as blue, green, bronze, gray, and non-exclusive examples of these glasses include glasses commercially available from PPG Industries, Inc. of Pittsburgh, Pa., under the names Solex® glass, Solargreen® glass, Solextra® glass, and VistaGray™ glass. The glass can be untempered, heat treated, or heat strengthened glass. As used herein, the term "heat treated" means heated to a temperature sufficient to bend or anneal or temper the glass. The term "heat strengthened" means annealed, tempered, or at least partially tempered. Although not limiting to the invention, examples of glass suitable for the practice of the invention are described in U.S. Pat. Nos. 4,746,347; 4,792,536; 5,240,886; 5,385,872; and 5,393,593.

In one particular practice of the invention, the substrate 12 is or comprises glass, such as but not limited to a glass sheet, such as a sheet of flat glass or window glass. For conventional automotive transparencies, a glass substrate can typically be up to 10 mm thick, e.g., in the range of 1 mm to 10 mm thick, e.g., less than 10 mm thick, e.g., 1 mm to 5 mm thick, e.g., 1.5 mm to 2.5 mm, e.g., 1.6 mm to 2.3 mm. The substrate 12 can be a flat substrate or can be shaped, bent, or curved. By the term "flat substrate" is meant a substrate lying primarily in a single geometric plane, e.g., such as a piece of flat glass produced by a conventional float glass process. By "shaped" or "bent" is meant a substrate that is not flat.

As described above, a functional coating 16 can be formed over at least a portion of the substrate 12. By "functional coating" is meant a coating that modifies one or more physical or optical properties of the substrate on which it is deposited, e.g., optical, thermal, chemical or mechanical properties, and is not intended to be entirely removed from the substrate during subsequent processing. The functional coating 16 can have one or more functional coating films or layers of the same or different composition or functionality.

The functional coating 16 can be, for example, an electrically conductive coating used to make heatable windows, such as is disclosed in U.S. Pat. Nos. 5,653,903 and 5,028,759, or a single-film or multi-film coating used as an antenna. Likewise, the functional coating 16 can be a solar control coating. As used herein, the terms "solar control coating" and/or "low emissivity coating" refer to a coating comprised of one or more layers or films that affect the solar properties of the coated article, such as but not limited to the shading coefficient and/or the amount of solar radiation, for example, visible, infrared (IR), or ultraviolet (UV) radiation, reflected from and/or passing through the coated article 10. A solar control coating can block, absorb or filter selected portions of the solar spectrum, such as but not limited to the IR, UV, and/or visible spectrums. Examples of solar control coatings that can be used in the practice of the invention are found in, but are not limited to, U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759, and also in U.S. patent application Ser. Nos. 09/058,440 and 60/355,912.

As will be appreciated by those skilled in the art, the functional coating 16 can affect the emissivity of the coated article, i.e., can be a low emissivity coating. A low emissivity coating allows short wavelength energy, e.g., visible or ultraviolet energy to be transmitted through the coating but reflects longer wavelength energy, such as infrared energy. By "low emissivity" is meant emissivity less than 0.4, such as less than 0.3, such as less than 0.2, such as less than 0.1, such as less than or equal to 0.05. The lower the emissivity, the more infrared wavelength energy is reflected. Non-limiting examples of low emissivity coatings are found in U.S. Pat. Nos. 4,952,423 and 4,504,109 and British reference GB 2,302,102.

The functional coating 16 can include one or more anti-reflective coating films comprising dielectric or anti-reflective materials, such as metal oxides, oxides of metal alloys, or doped metal oxides and/or doped metal alloys that are transparent to visible light. The functional coating 16 can also include one or more infrared reflective films comprising a reflective metal, e.g., a noble metal such as gold, copper or silver, or combinations or alloys thereof, and can further comprise one or more primer films or barrier films, such as titanium, nickel, chrome, nickel-chrome alloy, niobium, zirconium, or other primers known in the art, located over and/or under the metal reflective layer(s). Examples of suitable functional coatings 16 for use with the invention are commercially available from PPG Industries, Inc. of Pittsburgh, Pa. under the SUNGATE® and SOLARBAN® families of coatings.

In one practice, the functional coating 16 can include one or more coating units 26 as shown in FIG. 1. The coating unit(s) 26 can comprise a first dielectric layer 28, an infrared reflective metal layer 30, a primer layer 32, and a second dielectric layer 34. The first and/or second dielectric layers 28, 34 and the reflective metal layer 30 can be of any of the general materials described above and can be of any desired thickness. The functional coating 16 can include one coating unit 26 or can include a plurality of coating units 26 formed over the substrate 12.

The functional coating 16 can be deposited over the substrate 12 by any conventional method, such as conventional physical vapor deposition (PVD) or chemical vapor deposition (CVD) processes. Suitable deposition processes include, but are not limited to, spray pyrolysis, sol-gel, electron beam evaporation, or vacuum sputtering such as magnetron sputter vapor deposition (MSVD). In one embodiment, the functional coating 16 can be deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

In one specific embodiment, one or both of the dielectric layers 28 and/or 34 can comprise one or more films of anti-reflective materials and/or dielectric materials, such as but not limited to metal oxides, oxides of metal alloys, nitrides, oxynitrides, or mixtures thereof. The dielectric layers can be transparent to visible light. Examples of suitable metal oxides include, but are not limited to, oxides of titanium, hafnium, zirconium, niobium, zinc, bismuth, lead, indium, tin, and mixtures thereof. These metal oxides can have small amounts of other materials (e.g., dopants), such as manganese in bismuth oxide, indium-tin oxide, etc. Additionally, oxides of metal alloys or metal mixtures can be used, such as oxides containing zinc and tin (e.g., zinc stannate), oxides of indium-tin alloys, silicon nitrides, silicon aluminum nitrides, oxynitrides, or aluminum nitrides. Further, doped metal oxides or doped metal alloy oxides, such as but not limited to antimony or indium doped tin oxides or nickel or boron doped silicon oxides or tin doped zinc oxides, can be used. The dielectric layers 28, 34 can be substantially single phase films, such as a metal alloy oxide film, e.g., zinc stannate, or can be a mixture of phases composed of zinc and tin oxides, or can be composed of a plurality of metal oxide films, such as but not limited to those disclosed in U.S. Pat. Nos. 5,821,001; 4,898,789; and 4,898,790, or can be doped metal oxide films or doped metal alloy oxides films.

In one embodiment, the first dielectric layer 28 can have a total thickness of less than or equal to 500 Å, e.g., less than or equal to 400 Å, e.g., less than or equal to 280 Å. For example, the metal alloy oxide film 28 can have a thickness in the range of 100 Å to 500 Å, such as 150 Å to 400 Å, e.g., 200 Å, to 400 Å. The reflective layer 30 be an IR reflective metal, such as but not limited to gold, copper, silver, or mixtures, alloys, or combinations thereof, and can have a thickness in the range of 50 Å to 200 Å, such as 75 Å to 150 Å, e.g., 100 Å. In one particular embodiment of the invention, the IR reflective layer 30 comprises silver. The metal alloy oxide films 28, 34 can each include a zinc/tin alloy oxide. The zinc/tin alloy can comprise zinc and tin in proportions of 10 wt. % to 90 wt. % zinc and 90 wt. % to 10 wt. % tin. One suitable metal alloy oxide for use in the invention is zinc stannate. By "zinc stannate" is meant a composition of $Zn_xSn_{1-x}O_{2-x}$ (Formula 1), where x varies in the range of greater than 0 to less than 1. For instance the number x can be greater than 0 and can be any fraction or decimal between greater than 0 up to the number 1. For example, where x=⅔, Formula 1 is $Zn_{2/3}Sn_{1/3}O_{4/3}$, which is more commonly described as "$Zn_2SnO_4$". A zinc stannate containing film has one or more of the forms of Formula 1 in a predominant amount in the film. The metal oxide film can include a zinc-containing film, such as zinc oxide. The zinc oxide film can include other materials to improve the sputtering characteristics of the associated cathode, e.g., the zinc oxide can contain 0 to 20 wt. % tin, e.g., 0 to 15 wt. % tin, e.g., 0 to 10 wt. % tin.

The primer film 32 can be an oxygen capturing material, such as titanium, that can be sacrificial during the deposition process to prevent degradation or oxidation of the reflective layer 30 during a sputtering process. The oxygen capturing material can be chosen to oxidize before the material of the reflective layer 30.

The hybrid coating 14 further includes a protective coating or topcoat 18 to assist in providing protection against mechanical and chemical attack. For the monolithic article 10 shown in FIG. 1, the topcoat 18 includes a first topcoat layer 40, a second topcoat layer 42, and a third topcoat layer 44. Thus, unlike conventional protective overcoats that are typically a thin, single component film, the topcoat 18 of the invention is a multi-layer structure. However, unlike conventional lens coatings, the topcoat 18 has much fewer layers.

In one embodiment, the first topcoat layer 40 can have a low refractive index, the second topcoat layer 42 can have a high refractive index, and the third topcoat layer 44 can have a low refractive index. By "low refractive index" is meant a material having a refractive index less than that of the "high refractive index" material. That is, the terms "low" and "high" can be relative terms with respect to the materials chosen for the topcoat layers. For example, but not to be considered as limiting, the "low refractive index" material can have a refractive index of 2 or less. Examples of some suitable materials include, but are not limited to, oxides comprising aluminum, silicon, yttrium, tin, or mixtures or combinations thereof. The "high refractive index" material has a refractive index greater than that of the low refractive index material. For example, the high refractive index material can have a refractive index of greater than 2. Examples of some suitable materials include, but are not limited to, oxides comprising titanium, zirconium, niobium, bismuth, tungsten, zinc, tin, or mixtures or combinations thereof. In one non-limiting embodiment, the first topcoat layer 40 comprises silica, the second topcoat layer 42 comprises zinc oxide, and the third topcoat layer 44 comprises silica. As described above, some of the topcoat layers can include small amounts of other materials, e.g., dopants, for example provided to increase the conductivity of the cathode from which they are deposited. These other materials can include one or more of aluminum, silicon, and/or tin, just to name a few. The adjacent low and high index materials can have a refractive index difference of at least 0.2. By "refractive index difference" is meant the difference between the refractive indices of two adjacent topcoat layers. For example, the refractive index difference can be in the range of 0.2 to 1, such as 0.2 to 0.6, such as 0.4. Alternatively, the first topcoat layer 40 can comprise a high refractive index material, the second topcoat 42 can comprise a low refractive index material, and the optional third topcoat layer 44 can comprise a high refractive index material.

One or more of the topcoat layers can include a dopant to increase the conductivity of the cathode from which they are deposited. For example, one or more of the topcoat layers can comprise silica doped with aluminum, e.g., 0.1 wt. % to 25 wt. % aluminum, such as 5 wt. % to 20 wt. % aluminum, such as 10 wt. % to 20 wt. % aluminum, such as 10 wt. % aluminum. As a further non-limiting example, one or more of the topcoat layers can comprise zinc oxide doped with tin, e.g., 1 wt. % to 15 wt. % tin, such as 2 wt. % to 10 wt. % tin, such as 5 wt. % tin.

The topcoat layers 40, 42, and 44 can be of any desired thickness. However, in one particular embodiment, the first topcoat layer 40 and second topcoat layer 42 can have a thickness of about 1 quarter wave optical thickness (i.e., 1 QWOT) with respect to a reference wavelength of 550 nanometers and the third topcoat layer 44 can have a QWOT less than 1. As will be appreciated by one skilled in the art and as used herein, the "optical thickness" of a material is defined as the thickness of the material divided by the refractive index of the material. Thus, 1 quarter wave optical thickness (QWOT) of a material having a refractive index of 2 with respect to a reference wavelength of 550 nm would be 0.25× (550 nm ÷2), which equals 68.75 nm. As another example, 0.33 QWOT of a material having a refractive index of 1.75 with respect to a reference wavelength of 550 nm would be equivalent to 0.33×[0.25×(550 nm÷1.75)] or 25.93 nm. Conversely, a material with an index of refraction of 2.2 and a thickness of 50 nm would be equivalent to [(50 nm÷550 nm)×2.2]÷0.25 or 0.8 QWOT based on a wavelength of 550 nm. As will be appreciated, although the quarter wave optical thickness of two materials may be the same, the actual physical thickness of the layers may be different due to the differing refractive indices of the materials. In the following discussion, the QWOT values are those defined with respect to a reference wavelength of 550 nm.

In another embodiment, the first topcoat layer 40 can have a QWOT in the range of 0.1 to 1, such as 0.5 to 0.6. The second topcoat layer 42 can have a QWOT in the range of 0.5 to 1.5, such as 1 to 1.5, such as 1.2 to 1.4. The third topcoat layer 44 can have a QWOT in the range of 0.5 to 1, such as 0.6 to 0.8.

In one particular embodiment, the hybrid coating 14 can include a functional coating 16 having a first dielectric layer 28 comprising a first film comprising a zinc and tin alloy, e.g., zinc stannate, having a QWOT in the range of 0.1 to 1, such as 0.2 to 0.7. The first dielectric layer 28 can also include a second film formed over the first film. In one embodiment, the second film comprises zinc oxide. Although not required, the zinc-oxide second film can be doped with another material, such as 1 wt. % to 10 wt. % tin, such as 2 wt. % to 7 wt. % tin, such as 5 wt. % tin. The second film can have a QWOT in the range of 0.01 to 1, such as 0.05 to 0.5, such as 0.1 to 0.15. The IR reflective layer 30 comprises silver and can have a thickness in the range of 0.005 QWOT to 0.1 QWOT, such as 0.007 QWOT to 0.03 QWOT, such as 0.01 QWOT to 0.015 QWOT, such as 0.0125 QWOT. The primer 32 can be titania and can have a thickness in the range of 0.01 QWOT to 0.06 QWOT, such as 0.02 QWOT to 0.04 QWOT, such as 0.03 QWOT. The second dielectric layer 34 can include a first film comprising zinc oxide doped with tin, such as 1 wt. % to 10 wt. % tin, such as 2 wt. % to 7 wt. % tin, such as 5 wt. % tin. The first film can have a thickness in the range of 0.05 QWOT to 0.5 QWOT, such as 0.1 QWOT to 0.15 QWOT. A second dielectric film can be formed over the first film. The second film can comprise a zinc-tin alloy, such as zinc stannate, and can have a thickness in the range of 0.1 to 1.5 QWOT, such as 0.2 to 1 QWOT.

The exemplary hybrid coating 14 further includes a topcoat 18 having a first topcoat layer comprising silica having a thickness in the range of 0.5 QWOT to 1.5 QWOT, such as 0.8 QWOT to 1.3 QWOT, such as 0.9 QWOT to 1.2 QWOT, such as 1 QWOT. The second topcoat layer 42 can comprise tin oxide and can have a thickness in the range of 0.05 QWOT to 1.5 QWOT, such as 0.08 QWOT to 1.3 QWOT, such as 0.09 QWOT to 1.2 QWOT, such as 1 QWOT. The third topcoat layer 44 can comprise silica and can have a thickness in the range of 0.1 QWOT to 1 QWOT, such as 0.2 QWOT to 0.9 QWOT, such as 0.3 QWOT to 0.8 QWOT, such as 0.4 QWOT to 0.8 QWOT, such as 0.5 QWOT to 0.8 QWOT, such as 0.6 QWOT to 0.8 QWOT, such as 0.7 QWOT.

Figure 2:
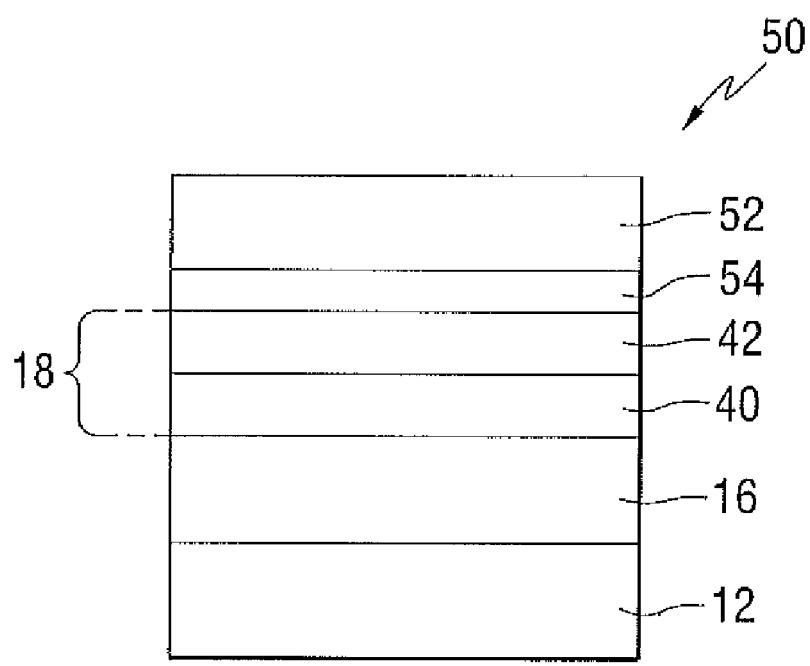
FIG. 2 is a cross-sectional view (not to scale) of a laminated article having a hybrid coating incorporating features of the invention.

A laminated article 50 is shown in FIG. 2. In the laminated article 50, the coated substrate 12 can be laminated to another substrate 52 by a conventional adhesive layer 54. The substrate 52 can be of any of the materials described above with respect to substrate 12 and can be the same or different than substrate 12. The adhesive layer 54 can include one or more plastic or polymeric materials, such as polyvinyl butyral, plasticized polyvinyl chloride, or multi-layered thermoplastic materials including polyethylene terephthalate. Suitable adhesive materials are described in U.S. Pat. Nos. 4,287,107 and 3,762,988. For automotive purposes, the adhesive layer 54 is typically polyvinyl butyral having a thickness in the range of 0.5 mm to 1 mm. The functional coating 16 can be the same as described above. However, the outermost topcoat layer 44 (shown in FIG. 1) can be eliminated for the laminated article 50.

Illustrating the invention are the following Examples, which are not to be considered as limiting the invention to the specifically disclosed details.

EXAMPLE 1

This Example illustrates the solar reflectivity of a single silver layer solar control coating with a topcoat of the invention and without a topcoat of the invention.

Table 1 shows the layer structure of a solar control coating having a single silver infrared reflective layer. The first dielectric layer comprises two dielectric films (1 and 2). The first dielectric film (film 1) comprises zinc stannate while the second dielectric film (film 2) comprises a tin doped zinc oxide. The tin is due to the fact that the sputtering cathode from which the layer is deposited includes some tin to improve the sputtering characteristics of the zinc cathode. Thus, while the second dielectric film is primarily zinc oxide, some tin from the cathode can also be present, such as incorporated into the zinc oxide structured or as tin oxide. The second dielectric layer comprises two dielectric films (5 and 6). The first dielectric film (film 5) comprises a tin doped zinc oxide while the second dielectric film (film 6) comprises zinc stannate.

TABLE 1

| Film | Material | Thickness (nm) | QWOT |
|---|---|---|---|
| 1 | $Zn_2SnO_4$ | 41.67 | 0.62341 |
| 2 | $Sn:ZnO_4$ | 8.00 | 0.11514 |
| 3 | Ag | 9.42 | 0.00792 |
| 4 | $TiO_2$ | 2.00 | 0.03577 |
| 5 | $Sn:ZnO_4$ | 8.00 | 0.11514 |
| 6 | $Zn_2SnO_4$ | 26.79 | 0.4008 |

Table 2 shows the structure of a similar coating but also incorporates a topcoat (films 7, 8 and 9) of the invention. The topcoat comprises a first topcoat layer of silica that also includes a small portion of alumina. The alumina is present due to the presence of aluminum in the silicon sputtering target. The second topcoat layer comprises zinc oxide with a small portion of tin. The third topcoat layer comprises silica with a small portion of alumina.

TABLE 2

| Film | Material | Thickness (nm) | QWOT |
|---|---|---|---|
| 1 | $Zn_2SnO_4$ | 41.67 | 0.62341 |
| 2 | $Sn:ZnO_4$ | 8.00 | 0.11514 |
| 3 | Ag | 9.42 | 0.00792 |
| 4 | $TiO_2$ | 2.00 | 0.03577 |
| 5 | $Sn:ZnO_4$ | 8.00 | 0.11514 |
| 6 | $Zn_2SnO_4$ | 26.79 | 0.4008 |
| 7 | $Si_{0.85}Al_{0.15}O_{1.925}$ | 89.92 | 0.97174 |
| 8 | $Sn:ZnO_4$ | 91.13 | 1.36336 |
| 9 | $Si_{0.85}Al_{0.15}O_{1.925}$ | 63.65 | 0.68785 |

Figure 3:
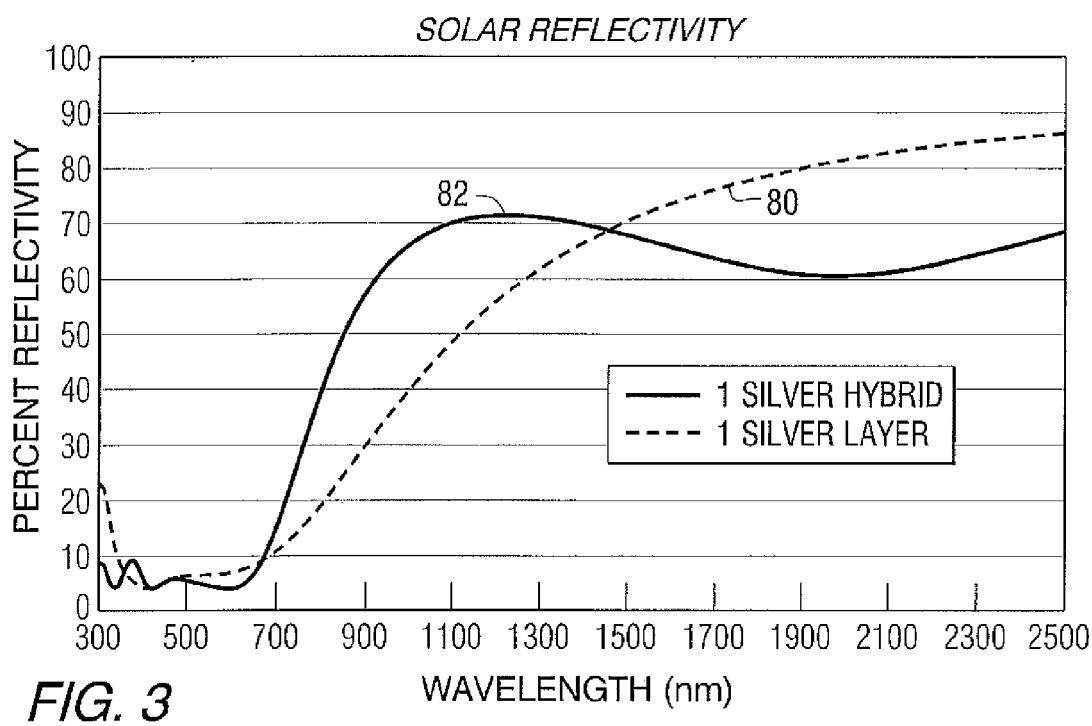
FIG. 3 is a graph of percent reflectance versus wavelength (nanometers) comparing a single silver layer coating having a topcoat of the invention with a similar single silver layer coating without the topcoat of the invention.

FIG. 3 shows the percent reflectance versus wavelength for the coating of Table 1 (curve 80) and of Table 2 (curve 82). The reflectance values shown in FIG. 3 were calculated using FilmStar DESIGN software commercially available from FTG Software Associates of Princeton, N.J. As shown in FIG. 3, the hybrid coating of curve 82 has substantially better solar reflectance in the near infrared region of the spectrum than the coating of curve 80 without the topcoat of the invention. The hybrid coating provides a region of enhanced solar infrared reflectance in the near solar infrared region adjacent the visible region of the electromagnetic spectrum. Such an enhanced infrared reflective region would not be expected simply from the addition of a multi-layer topcoat. Therefore, the utilization of a topcoat having low and high refractive index materials in accordance with the present invention appears to improve the solar control performance compared to a similar functional coating without the topcoat. Additionally, it is to be expected that the topcoat of the invention will provide improved mechanical and/or chemical durability compared to conventional thinner titania coatings of the known art.

EXAMPLE 2

This Example illustrates the effects of a topcoat on the invention of a functional coating having two silver infrared reflective metal layers.

A coating stack having two infrared reflective silver layers is set forth in Table 3.

TABLE 3

| Film | Material | Thickness (nm) | QWOT |
|---|---|---|---|
| 1 | $Zn_2SnO_4$ | 31.79 | 0.4756 |
| 2 | $Sn:ZnO_4$ | 8.00 | 0.11514 |
| 3 | Ag | 8.91 | 0.00749 |
| 4 | $TiO_2$ | 2.00 | 0.03577 |
| 5 | $Sn:ZnO_4$ | 8.00 | 0.11514 |
| 6 | $Zn_2SnO_4$ | 60.85 | 0.91036 |
| 7 | $Zn_{0.95}Sn_{0.05}O_{1.05}$ | 8.00 | 0.11514 |
| 8 | Ag | 10.95 | 0.00921 |
| 9 | $TiO_2$ | 2.00 | 0.03577 |
| 10 | $Sn:ZnO_4$ | 8.00 | 0.11514 |
| 11 | $Zn_2SnO_4$ | 32.55 | 0.48697 |

A similar coating having a topcoat of the invention is shown in Table 4.

TABLE 4

| Film | Material | Thickness (nm) | QWOT |
|---|---|---|---|
| 1 | $Zn_2SnO_4$ | 18.04 | 0.26989 |
| 2 | $Sn:ZnO_4$ | 8.00 | 0.11514 |
| 3 | Ag | 8.91 | 0.00749 |
| 4 | $TiO_2$ | 2.00 | 0.03577 |
| 5 | $Sn:ZnO_4$ | 8.00 | 0.11514 |
| 6 | $Zn_2SnO_4$ | 54.22 | 0.81117 |
| 7 | $Sn:ZnO_4$ | 8.00 | 0.11514 |
| 8 | Ag | 10.95 | 0.00921 |
| 9 | $TiO_2$ | 2.00 | 0.03577 |
| 10 | $Sn:ZnO_4$ | 8.00 | 0.11514 |
| 11 | $Zn_2SnO_4$ | 26.61 | 0.3981 |
| 12 | $Si_{0.85}Al_{0.15}O_{1.925}$ | 51.85 | 0.56033 |
| 13 | $Sn:ZnO_4$ | 89.22 | 1.33479 |
| 14 | $Si_{0.85}Al_{0.15}O_{1.925}$ | 69.68 | 0.75301 |

In both coatings, the thickness of the dielectric layers has been adjusted to produce a film having a reflected color of $L^*=25.85$, $a^*=-1.00$, and $b^*=-2.00$.

Figure 4:
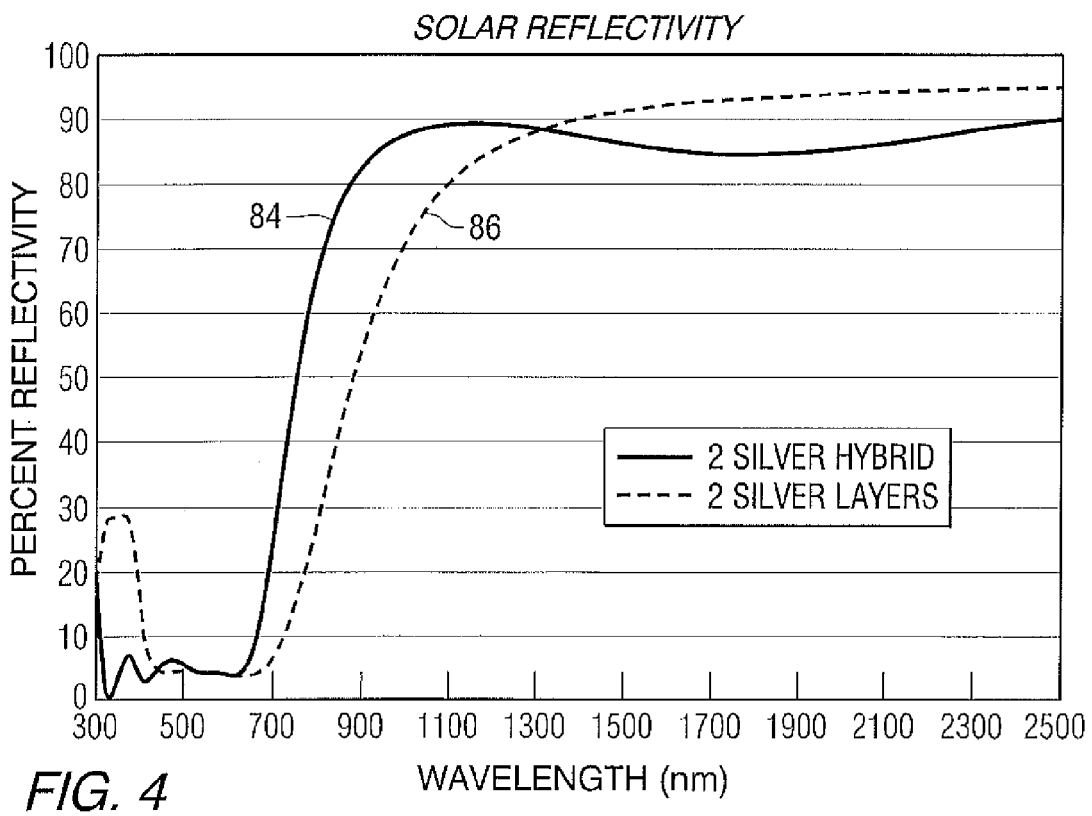
FIG. 4 is a graph of percent reflectance versus wavelength (nanometers) comparing a double silver layer coating having a topcoat of the invention with a similar double silver layer coating without the topcoat of the invention.

The solar reflectivity of the coatings shown in Tables 3 and 4 is depicted in FIG. 4. As can been seen from the figure, the coating with the topcoat of the invention (curve 84) shows improved solar reflectivity in the near infrared region compared to the coating without the topcoat of the invention (curve 86).

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A coating, comprising:
   a functional coating comprising:
   a first dielectric layer comprising a first layer having a quarter wave optical thickness in the range of 0.1 to 1, and a second layer having a quarter wave optical thickness in the range of 0.1 to 1;
   a first infrared reflective metal layer having a quarter wave optical thickness in the range of 0.005 to 0.1; and
   a second dielectric layer comprising a first layer having a quarter wave optical thickness in the range of 0.05 to 0.5 and a second layer having a quarter wave optical thickness in the range of 0.1 to 1.5; and
   a topcoat formed over at least a portion of the functional coating, the topcoat comprising:
   a first topcoat layer comprising silica having a quarter wave optical thickness in the range of 0.5 to 1.5 with respect to a wavelength of 550 nm; and
   a second topcoat layer comprising zinc stannate having a quarter wave optical thickness in the range of 0.5 to 1.5 with respect to a wavelength of 550nm, and
   wherein the topcoat is sufficiently thick so as to affect the optical properties of the coating.

2. The coating of claim 1, wherein the metal layer includes at least one of gold, copper, silver, or mixtures, alloys, or combinations including at least one thereof.

3. The coating of claim 1, wherein the refractive index of the first topcoat layer differs from the refractive index of the second topcoat layer by a value in the range of 0.2 to 1.0.

4. The coating of claim 1, wherein the first layer of the first dielectric layer comprises at least one oxide of zinc, tin, or alloys or mixtures thereof, the second layer of the first dielectric layer comprises at least one oxide of zinc, tin, or alloys or mixtures thereof, the metal layer comprises silver, the first layer of the second dielectric layer comprises at least one oxide of zinc, tin, or alloys or mixtures thereof, and the second layer of the second dielectric layer comprises at least one oxide of zinc, tin, or alloys or mixtures thereof.

5. The coating of claim 1, wherein the topcoat further comprises a third topcoat layer having a quarter wave optical thickness in the range of 0.5 to 1 with respect to a reference wavelength of 550 nm and a refractive index different from the second refractive index.

6. The coating of claim 5, wherein the third topcoat layer comprises silicon dioxide.

7. A coated article, comprising:
   a substrate; and
   a coating as defined in claim 1 deposited over at least a portion of the substrate.

8. The coating of claim 1, wherein the topcoat is sufficiently thick so as to provide a region of enhanced solar reflectance in the near solar infrared region adjacent the visible region of the electromagnetic spectrum.

9. A method of providing a coated article having a region of enhanced solar reflectance in the near solar infrared region adjacent the visible region of the electromagnetic spectrum, comprising:
   providing a substrate; and
   forming a coating as defined in claim 1 over at least a portion of the substrate.

10. A coated article, comprising:
    a glass substrate; and
    a coating deposited over at least a portion of the substrate, the coating comprising:
    a functional coating comprising:
    a first dielectric layer comprising a first layer comprising zinc stannate having a quarter wave optical thickness in the range of 0.1 to 1, and a second layer comprising zinc oxide having a quarter wave optical thickness in the range of 0.1 to 1;
    a first infrared reflective metal layer comprising silver having a quarter wave optical thickness in the range of 0.005 to 0.1; and
    a second dielectric layer comprising a first layer comprising zinc oxide having a quarter wave optical thickness in the range of 0.05 to 0.5 and a second layer comprising zinc stannate having a quarter wave optical thickness in the range of 0.1 to 1.5; and
    a topcoat comprising a first topcoat layer and a second topcoat layer,
    wherein the first topcoat layer comprises silica having a quarter wave optical thickness in the range of 0.5 to 1.5 with respect to a reference wavelength of 550 nm, and
    wherein the second topcoat layer comprises zinc stannate having a quarter wave optical thickness in the range of 0.5 to 1.5 with respect to a wavelength of 550 nm.

11. The coated article of claim 10, further comprising a second substrate laminated to the first substrate.

* * * * *